United States Patent
Safa

(10) Patent No.: US 11,073,994 B2
(45) Date of Patent: *Jul. 27, 2021

(54) SYSTEM AND METHOD TO SECURE A COMPUTER SYSTEM BY SELECTIVE CONTROL OF WRITE ACCESS TO A DATA STORAGE MEDIUM

(71) Applicant: Eighth Street Solutions LLC, Dallas, TX (US)

(72) Inventor: John Safa, London (GB)

(73) Assignee: Eighth Street Solutions LLC, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/561,855

(22) Filed: Sep. 5, 2019

(65) Prior Publication Data

US 2020/0133522 A1 Apr. 30, 2020

Related U.S. Application Data

(63) Continuation of application No. 15/421,984, filed on Feb. 1, 2017, now Pat. No. 10,503,418, which is a continuation-in-part of application No. 11/858,752, filed on Sep. 20, 2007, now Pat. No. 7,664,924, and a continuation of application No. 11/292,910, filed on Dec. 1, 2005, now Pat. No. 9,600,661.

(60) Provisional application No. 60/826,377, filed on Sep. 20, 2006.

(51) Int. Cl.
*G06F 3/06* (2006.01)
*H04L 29/06* (2006.01)
*G06F 21/56* (2013.01)
*G06F 21/52* (2013.01)
*G06F 21/55* (2013.01)

(52) U.S. Cl.
CPC .......... *G06F 3/0622* (2013.01); *G06F 3/0659* (2013.01); *G06F 3/0676* (2013.01); *G06F 21/52* (2013.01); *G06F 21/554* (2013.01); *G06F 21/564* (2013.01); *H04L 63/101* (2013.01); *G06F 2221/2115* (2013.01); *G06F 2221/2141* (2013.01)

(58) Field of Classification Search
CPC .... G06F 3/0622; G06F 3/0659; G06F 3/0676; G06F 21/52; G06F 21/554; G06F 21/564; G06F 2221/2115; G06F 2221/2141; H04L 63/101

See application file for complete search history.

(56) References Cited

U.S. PATENT DOCUMENTS

2007/0294756 A1* 12/2007 Fetik .................. H04L 63/0209
726/11

* cited by examiner

*Primary Examiner* — Larry T Mackall
(74) *Attorney, Agent, or Firm* — Stephens Domnitz Meineke, PLLC; Matthew C. Juren

(57) ABSTRACT

A system and method of securing a computer system by controlling write access to a storage medium by monitoring an application; detecting an attempt by the application to write data to said storage medium; interrogating a rules database in response to said detection; and permitting or denying write access to the storage medium by the application in dependence on said interrogation.

32 Claims, 3 Drawing Sheets

SYSTEM AND METHOD TO SECURE A COMPUTER SYSTEM BY SELECTIVE CONTROL OF WRITE ACCESS TO A DATA STORAGE MEDIUM

PRIORITY CLAIM

This is a utility patent application. This application is a continuation of U.S. patent application Ser. No. 15/421,984 filed on Feb. 1, 2017, which is a continuation-in-part to U.S. patent application Ser. No. 11/858,752, filed on Sep. 20, 2007, now U.S. Pat. No. 7,664,924, issued on Sep. 16, 2010 which claims priority to U.S. Provisional Application No. 60/826,377, filed on Sep. 20, 2006; and is a continuation of U.S. patent application Ser. No. 11/292,910, filed on Dec. 1, 2005, now issued as U.S. Pat. No. 9,600,661 on Mar. 21,2017, all of which are herein incorporated by reference in their entireties for all that they teach.

FIELD OF INVENTION

The present invention relates to a method of controlling the writing of data to a storage medium such as a hard drive in a computer system by an application running in a memory of the computer system.

BACKGROUND

The use of computers for Internet and other communication purposes, particularly in relation to electronic mail and the downloading of applications over the Internet has led to the proliferation of so-called computer viruses. Whilst anti-virus programs have been developed to combat these, they can be relatively elaborate and expensive and usually operate to deal with an offending virus only after the operating system of the computer has been infected. There are so many variants of virus programs being released that anti-virus programs cannot identify new viruses quickly enough.

The present invention seeks to provide an improved method of preventing the infection of a computer by a virus program.

According to the present invention there is provided a method of controlling write access to a storage medium by monitoring an application; detecting an attempt by the application to write data to said storage medium; interrogating a rules database in response to said detection; and controlling write access to the storage medium by the application in dependence on said interrogation.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Preferably the interrogation comprises determining the write access allowed for the application and controlling the write access in dependence thereon.

Preferably write access is controlled to one of a plurality of levels, the levels including a first level in which no write access is allowed, a second level in which full write access is allowed, and a third level in which write access is only allowed for at least one specified file extension.

Preferably where write access is controlled to the first level, the method further includes generating a prompt on a display requesting response from a user.

Preferably the user can respond to the prompt by choosing from a number of possible responses, the possible responses including a first response for allowing write access, a second response for blocking write access and a third response for allowing write access to a specific file type only.

Preferably the user can respond further by selecting from a plurality of further actions, the further actions including, storing the chosen response in the rules database; and applying the chosen response only for the current attempt by the application to write data to said storage medium.

Figure 1:
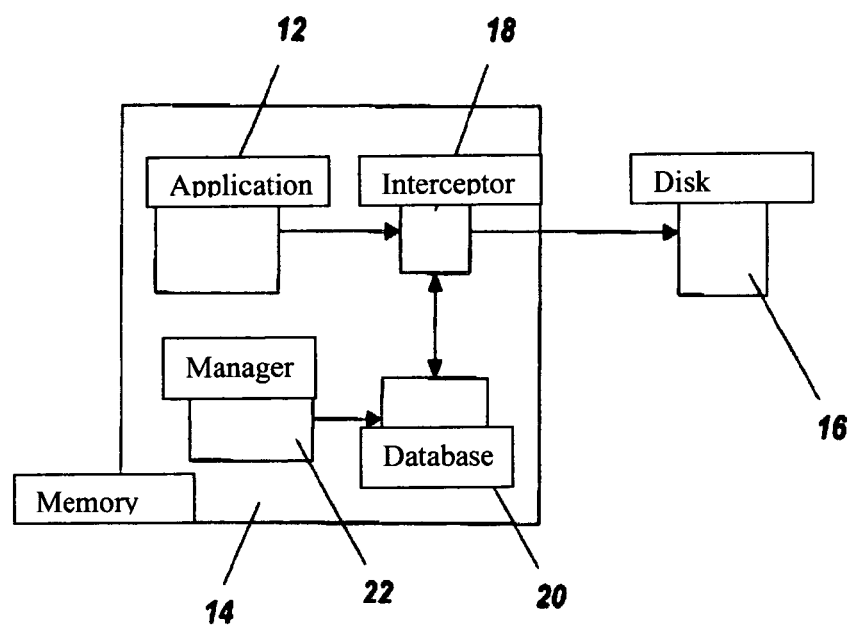
FIG. 1 is a process diagram showing the control of a write instruction of an application in accordance with a preferred method of the present invention.

Referring firstly to FIG. 1, this shows an application 12 which is running in a memory 14 of a computer system. The computer system also has a storage medium 16 which here is in the form of a hard drive or disc.

The typical computer is comprised of a central processing unit, a main memory, a mass storage device and input and output connections. The input and output include keyboards, monitors and network connections. The mass storage device can be a magnetic disk, optical disk or a large array of semiconductor devices. The main memory is typically an array of semiconductor circuits. The central processing unit is operatively connected to these components so that it can both control their activities and move data among the components. The central processing unit can load data off of the mass storage device and write it into main memory. This data can either be treated as a program or as data to be processed. If a program, the central processing unit passes control to the program data and executes the instructions encoded in the data. Program data can be an application servicing the user.

When the computer is first booted up it automatically loads an application 18 which is here termed as an "interceptor" program. This runs constantly in the background. As an alternative to being loaded on boot up of the computer, it can, of course, be run at the user's prompt at any time whilst the computer is operating. In addition, the interceptor program can run continuously in the background as a process, including as part of the computer operating system.

When the application 12 attempts to write data to the disc 16 the interceptor program 18 detects this and interrogates a rules database 20 to determine the authority of the application 12 to write to the hard drive 16. The database 20 is preferably encrypted and lists applications approved by the user with their level of write access. Practitioners of ordinary skill will recognize that the rule database is a set of entries or references in a data structure where the identity of an application is paired with one or more permission values, which encode the write access levels. A rule is therefore one or more permission values associated with an application. A rule can also include the signature of the application, which is used in embodiments where the application code is checked to be sure it has not been tampered with. A rule that is transmitted to a computer for updating the database will preferably include a reference to the application, which may be the name of the application, and the associated permission values for the permitted or denied write access levels, and may include the associated signature. The term data is used here in its general sense to include any form of data including programs. Although the invention is described in the preferred embodiment as applied to a hard disk, practitioners of ordinary skill will recognize that the application works equally well on any storage medium, including any mass storage device. The preferred number of possible write access levels for an application is three, being as follows:

Level 0—this means that no write access to the hard drive 16 is allowed for the application 12.

Level 1—this means that full write access is allowed.

Level 2—the application is allowed write access to the hard drive 16 for specified file extensions only, (for example ".doc" file extensions for document files in Microsoft Office™) file extensions of data that can be written to the hard drive are also held in the database 20.

Level 4—The application can be granted to have access to a specific drive or directory. The database can contain corresponding references between applications and file types or file extensions that such application may write.

There are a number of rules which can be applied to the database 20 and these are controlled by a manager program 22 which can sit in the memory 14 alongside the interceptor program 18 and can also be run on start up of the computer or at any preferred time during operation of the interceptor program 18, running continuously in the background, including as part of the computer operating system.

Figure 2:
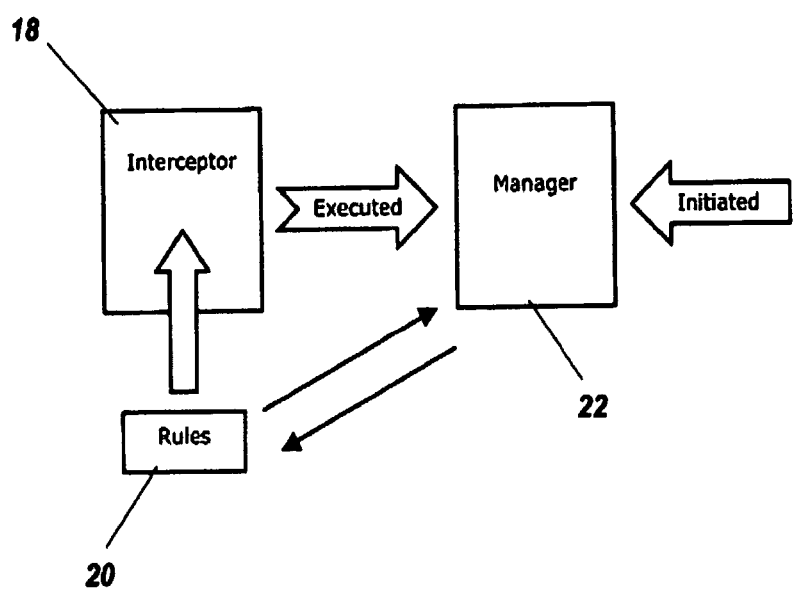
FIG. 2 is a process diagram illustrating an action of the preferred method according to the present invention.

FIG. 2 illustrates the interface of the manager program 22 with the rules database 20 and the system user.

When the interceptor program 18 detects that the application 12 is attempting to write to the hard drive 16 it initiates the loading and execution of the manager program 22. The latter interrogates the rules database 20 to determine the access level of the application 12 and controls the interceptor program 18 to allow or prevent the write action in dependence on the relevant rule in the rules database 20. If the application 12 is not listed in the rules database 20 or the particular write instruction is not allowed, the manager program 22 can generate a prompt signal to be displayed on the computer screen, requiring the user to make a decision on whether or not to allow the write instruction. This prompt can have a number of responses for the user to choose, such as "Allow write access", "Block write access" and "Allow write access to this file type only". Having chosen the response the user can also select one of a number of further actions as follows.

1 Store the response in the rules database—The response is stored in the rules database as a further rule to be applied to that application on all future write actions.

2 Block once the write action—This prevents the requested write action for this occasion only and further write attempts by the application again result in a user prompt.

3 Allow once the write action—This allows the requested write action but any future write requests for the application again result in a user prompt.

Thus, for example, if the application 12 is attempting to write a file to the hard drive 16 with a particular file extension, the rules database 20 can be updated such that all future attempts by the application 12 to write files of that same extension to the hard drive 16 would be automatically allowed or prevented or result in further user prompts.

The privilege to write to the hard drive is distinct from the privilege to write to a directory. The former can be independent of the latter, that is, an application can have the privilege to write to the hard drive, independently of what directory the write is to occur in. As a result, the rules database comprising privilege levels can contain a privilege entry associated with an application whose value is independent of the directory the application is seeing to write to.

Practitioners of ordinary skill will recognize that in some operating systems, including Windows™, file extensions can be arbitrarily applied to a file while the file contents are in fact something else. This common trick is used by virus writers to distribute an executable payload with an extension other then .exe (in the Windows case). Thus, users can be tricked into clicking on (in order to view) what appears to be a non-executable (a .jpg extension for a JPEG image, for example), but the computer, recognizing that internally, the file is an executable, will pass control to the program and launch it—thus propagating the virus. Therefore, where determining the "file extension" is referred to in this disclosure, it also includes detecting the actual type of file by examination of its contents, especially in the case where internally such file is an executable. Reference is made to Windows XP in a Nutshell, Second Edition, © 2005, O'Reilly Media, U.S.A. Reference is made to Microsoft Windows Internals, 4th Edition: Microsoft Windows Server 2003, Windows XP, and Windows 2000, Mark E. Russinovich, David A. Solomon, Microsoft Press, Hardcover, 4th edition, Published December 2004, 935 pages, ISBN 0735619174.

The manager program 22 can also be loaded and executed by the user at start up of the computer or at any time in order to scan the hard drive 16 for programs to build a full rules database 20. The manager program 22 can also be prompted by the user to display a list of programs within the rules database 20 with the access level of each program, giving the user the option to delete, add or modify each entry. In addition, a rules database can be pre-created, or incrementally improved and distributed to the computer electronically, either embodied on a disk or electronically over a data network. Rules determined by users can also be uploaded to a central depository as well. Rule updates can be downloaded into the computer. Rules can also be included with installation files for the particular application that the installation file is creating. In this case, the installation process has to be sufficiently certified that program installation does not corrupt the database by incorporating bogus rules that service virus writers. Certification can include digital signing protocols between the invention and the installing program and other modes of verifying authenticity, including remotely accessed keys or trusted third parties accessed over a network. Rules can also be derived by examining operating system data where such data presents correspondences between installed program applications and file types and extensions. In this case, other authentication may be necessary in order to avoid virus writers from inserting bogus file type associations within the operating system databases. Practitioners of ordinary skill will recognize that authentication can include cyclic redundancy checking (CRC) and other types of numerical algorithms that detect when tampering has occurred.

Figure 3:
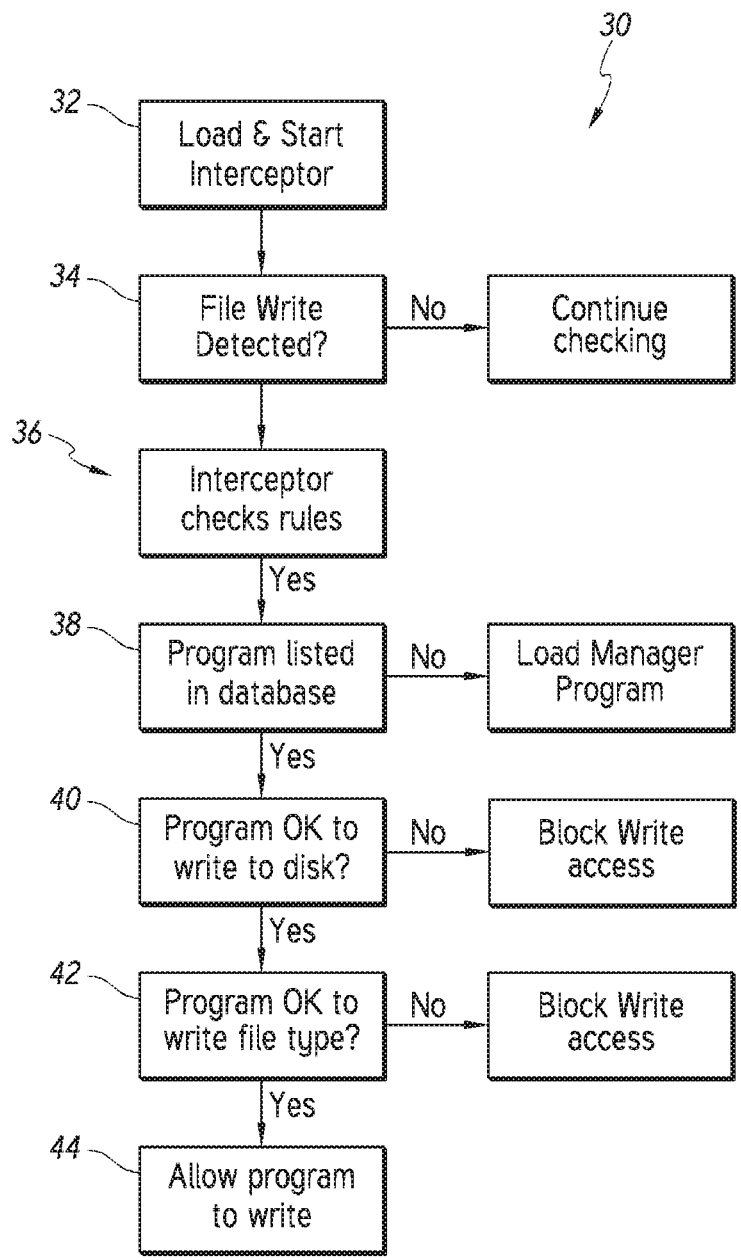
FIG. 3 is a flow diagram of the preferred method.

In FIG. 3 a flow diagram 30 is shown which illustrates the method followed on initiation 32 of the interceptor program 18. In the preferred embodiment, the interceptor module is a kernel mode driver which has a higher level of access to the Windows file system and system resources. Once initiated the interceptor program 18 waits in a monitoring step 34 during which it monitors for any file write operation to the hard drive 16. In the absence of a file write operation, the interceptor program. 18 remains in the monitoring step 34 and continues to check for a file write operation.

If a file write operation is detected then write is pended in a queue and the interceptor program 18 proceeds to complete a series of rule checking steps 36 by calling a kernel mode rules checker. Initially the rules checker checks if the application 12 making the write attempt is listed in the rules database 20. The rules database can be stored on the local personal computer, client computer or remote server. In the preferred embodiment, a recent list of rules that have been interrogated may also be held in a cache in kernel memory cache which speeds up applications that are frequently accessing the drive. If the application 12 is not listed then the interceptor program 18 initiates the manager program 22 to allow the user to make a decision about the correct way in which to proceed. Otherwise, if the application 12 is listed then the interceptor program 18 proceeds to the next rule checking step.

On finding the application 12 listed in the rules database 20, the interceptor program 18 goes on to check if the write privileges of the application 12. Initially the hard drive write privilege of the application 12 is checked. If the application 12 does not have privilege to write to the hard drive then write access is blocked. Otherwise, the interceptor program 18 checks if the application 12 has write privilege for the specific file type, directory or filename which the write attempt has been made to. The manager program can, at this step, check the data to be written or the file to which such data is being appended to determine if the contents of the file are the appropriate file type, that is, to avoid improper creation of portable executable (PE) or other files whose contents are intended to be used as computer program code. PE files are files that are portable across all Microsoft 32-bit operating systems. The same PE-format file can be executed on any version of Windows 95, 98, Me, NT, and 2000. This is supplemental to checking the file extension in order to avoid the virus propagation technique described above. If the application 12 does have privilege to write to the specific detected file type or file extension then the write operation is allowed. Otherwise write access is blocked. A signature of the application, which is a number that is calculated to determine whether a code block has been tampered with, is also stored in the rules database. Practitioners of ordinary skill will recognize that CRC, or cyclic redundancy checks or other types of signature checking, for example, MD5 may be used. Reference is made to "Applied Cryptography" by Bruce Schneier, John Wiley & Sons, 1996, ISBN 0-471-11709-9. Practitioners of ordinary skill will recognize that these techniques can also be used to authenticate the rule database that the manager program uses to verify the permission of the application. This allows trusted programs to be allowed access to the drive if their signature/structure hasn't changed, that is, the program has determined that the there has not been tampering with the application. An example is that a trusted application could be infected with a Trojan or virus and still have access to the drive based on its earlier approval being registered in the database. The manager program can use a number of criteria for the drive access of an application. The rules can be based on file name, directory name, file type, file extension, registry access and creation of specific file types.

If no rules are found for an application then a prompt module can ask the user what access level or permission they wish to allow for the application. This can involve denying or blocking the application write for that instant or for ever. The user can also get information from other users responses to a specific application by data being downloaded from a central server over a data network, both a proprietary network as well as the Internet.

The system also allows feedback on the users responses to write requests to be uploaded and stored on a central server. This stores if the user allowed or denied the application write, or what level of permission was applied and if it was denied, the reason why. The reason the user denied it can be a number of responses such as 'virus', 'Trojan' etc. The applications name and signature are stored with the reason.

Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The spirit and scope of the present invention are to be limited only by the terms of the appended claims.

Operating Environment: The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The precise form factor of the user's computer does not limit the claimed invention. In one embodiment, the user's computer is omitted, and instead a separate computing functionality provided that works with the central server. In this case, a user would log into the server from another computer and access the system through a user environment.

The user environment may be housed in the central server or operatively connected to it. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the web site can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The user computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyperlink that causes the browser to request a new HTML document from another remote data network address location. The HTML can also have references that result in other code modules being called up and executed, for example, Flash or other native code.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP),or Unlicensed Mobile Access (UMA).

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. In a computer comprising a storage medium and an application running on said computer in conjunction with an operating system that manages access to a data storage device, a method of controlling write access to said data storage device by said application comprising:
   using the computer operating a detection process in a secure mode access an attempt by the running application to write data to said data storage device;
   transmitting an interim result from the data storage device to a remote server;
   retrieving from computer memory a permission data value result from a database comprised of data elements encoding either at least one permission value associated with the application or a value representing that no permission value for the application is present in the database; and
   controlling write access by the running application to store data to the data storage device in dependence on said retrieved permission result.

2. The method of claim 1 further comprising:
   inspecting the data that the application is attempting to store to determine if said data designates a file type;
   inspecting said data to determine if said data is of a type consistent with the designated file type; and
   further controlling write access by the running application to the storage medium in dependence on the result of the inspecting result.

3. The method of claim 2 with the additional step of receiving into said computer at least one data value that logically relates at an least one application name to an at least one file type.

4. The method of claim 1 where the permission value is a value that is independent of a directory location where the application is attempting to write data.

5. The method of claim 1 further comprising:
   determining that the permission value encodes the condition that no permission value for the application is present in the database; and
   prompting a user of the computer to input a data value that is a permission value to apply to the attempted write access by the running application.

6. The method of claim 1 in wherein the permission value encodes one of at least two levels, the at least two levels comprised of at least two of: first level in which no write access is allowed, a second level in which full write access is allowed, and a third level in which write access is only allowed to write data of at least one of a specified file type.

7. The method of claim 1 where the permission values are stored in a data structure that pre-exists the installation of the running application on the computer that executes the method.

8. The method of claim 1 where write access by the running application is prevented as a result of determining that no permission value corresponding to the running application is stored in the database.

9. The method of claim 1 with the further step of:
   generating a prompt on a user interface on said computer requesting a response from a user, accepting such response, and using such accepted response to generate a permission value, and updating the database to store the accepted response as a permission value associated with the running application.

10. The method of claim 9 further comprising:
    displaying on the user interface a number of possible responses to the prompt, the possible responses comprising a first response for allowing write access, a second response for blocking write access and a third response for allowing write access of a specific file type.

11. The method of claim 9 displaying on the user interface selections representing a plurality of further actions, the further actions comprised of: storing the chosen response in the database and receiving input representing an input selection of one of the further actions.

12. The method of claim 1 with the additional step of: in response to determining that no permission value associated with the running application is stored in the database, transmitting a request for the permission value to a remote computer operatively connected to the computer running the application by means of a data network; and receiving into said computer at least one additional permission value and storing said at least one additional permission value entry into the database stored on said computer.

13. The method of claim 1 where the controlling step blocks write access by the running application if the data to be stored is a portable executable file.

14. The method of claim 1 further comprising the step of automatically uploading at least one permission value associated with said running application from said computer to an additional computer over a data communications network.

15. The method of claim 1 further comprising the step of: in response to determining that a required permission value is not stored in the database, downloading from an additional computer over a data communications network at least one permission value and storing that value in the database.

16. The method of claim 1 where the database is stored on a remote server operatively connected to said computer by means of a data communication network.

17. The method of claim 1 further comprising:
determining if the permission value has been tampered with, and in dependence, on the determination that the permission value has been tampered with, blocking write access by the running application and ignoring the permission value.

18. The method of claim 1 further comprising:
receiving a permission value from a database stored on the remote server operatively connected to said computer by means of a data communication network in response to a query from said computer automatically generated as a result of a determination that said database does not contain a permission value corresponding to said running application, said received rule derived from data received by the remote server from a plurality of remote computers, said data received by the remote server comprising data input by a corresponding plurality of users encoding a permission value for said application.

19. A computer system for controlling write access to a first data storage device by at least one application running on a first computer system operatively connected to said first data storage device comprising:
the first data storage device;
a first rules database stored on the first computer system comprised of at least one application identifier data value and at least one corresponding permission data value;
an interceptor module operating a process on the first computer system in a secure mode that is configured by logic to monitor file system access on the first computer system by the at least one application operating distinct from the interceptor process, where such logic is configured to detect, a write access attempt to the first data storage device by the at least one running application, the interceptor module is further adapted by logic to control the write access to the first data storage device by retrieving from a central server a permission value corresponding to the at least one application attempting the write access to the first data storage device and using the retrieved permission value to determine whether to permit or prevent such write access to the first data storage device.

20. The computer system of claim 19 where the first rule database is encrypted.

21. The computer system of claim 19 further comprising a manager module operating on the first computer system that is operatively connected over one or more computer networks to a second rule database stored on a second computer system comprised of at least one application identifier data value and at least one corresponding permission data value where the manager module is configured by logic to automatically update the contents of the second rule database incrementally by transmitting data over a data network from the first rule database to the second rule database.

22. The computer system of claim 21 where the second rule database stored on a second computer system is operatively connected over one or more computer networks to a corresponding plurality of manager modules operating on a plurality of corresponding computer systems comprised of corresponding rule databases and each of the plurality of manager modules is adapted by logic to update its corresponding rule database by receiving data transmitted from the second rule database.

23. The computer system of claim 21 further comprising an input and output interface module that is configured by logic to receive as user input a permission value into the first computer system and the first computer system automatically transmitting that input permission value to the second rule database on the second computer system.

24. The computer system of claim 21 where the first rule database is further comprised of permission values that, when used by the interceptor module, cause the interceptor module to perform at least one of the operations: allow write access to the first data storage device, block write access to the first data storage device, allow write access to a specified file type on the first data storage device.

25. The computer system of claim 24 where the specified file type is an executable file type and the corresponding permission value denies write access to the first data storage device to store the executable file type.

26. The computer system of claim 21 where the first database is further comprised of at least one signature value corresponding to the at least one application identifier.

27. The computer system of claim 21 where the first database is further comprised of at least one file type value corresponding to the at least one application identifier.

28. The computer system of claim 19 further comprising an input and output interface module that is adapted by logic to enable a user of the first computer system to input data into the first computer system that the interface module uses to modify the first rule database.

29. A method of controlling write access to a data storage device by an application running in application space on a first computer comprising:
receiving at a plurality of server computers operatively connected by a computer network by means of appropriate inter process communication from a plurality of second computers operatively connected to the plurality of server computers by means of a data network, a corresponding plurality of permission values associated with the application operating on the first computer;
storing said permission values;
generating an output permission value for the application in dependence on the stored permission values;
receiving at said plurality of server computers from the first computer operatively connected to the plurality of server computers by means of a data network, a request for a permission value associated with the application running on the first computer as a result of a process monitoring write access requests by the application on the first computer detecting an attempt by the application to write data to the data storage device, interrogating a local database of permission values and failing to locate a permission value associated with the application in the local database;
selecting the stored permission value in response to receiving the request; and
transmitting to said first computer the output permission value derived from the plurality of received permission values to the first computer over the data network in order to cause the monitoring process operating on the first computer to permit or deny write access by the application to the data storage device in dependence on the transmitted output permission value.

30. The method of claim 29 where the output permission value has at least two states, one of which denies permission for the application to write to the storage medium.

31. The method of claim 29 where the output permission value designates permission to write at least one specified data file type.

32. The method of claim 29 where the output transmitted permission value is transmitted with a signature associated with the application.

\* \* \* \* \*